United States Patent
Spencer et al.

(10) Patent No.: US 11,420,746 B2
(45) Date of Patent: *Aug. 23, 2022

(54) INTERIOR PANEL FOR AN INTERIOR OF AN AIRCRAFT AND A METHOD FOR MAKING THE SAME

(71) Applicant: Gulfstream Aerospace Corporation, Savannah, GA (US)

(72) Inventors: Stephen Spencer, Savannah, GA (US); Sean Thornton, Savannah, GA (US); John Bullock, Savannah, GA (US); Kristin Medin, Savannah, GA (US)

(73) Assignee: Gulfstream Aerospace Corporation, Savannah, GA (US)

(*) Notice: Subject to any disclaimer, the term of this patent is extended or adjusted under 35 U.S.C. 154(b) by 87 days.

This patent is subject to a terminal disclaimer.

(21) Appl. No.: 16/568,026

(22) Filed: Sep. 11, 2019

(65) Prior Publication Data

US 2021/0070446 A1   Mar. 11, 2021

(51) Int. Cl.
| | |
|---|---|
| *B64D 11/00* | (2006.01) |
| *F21V 11/08* | (2006.01) |
| *F21Y 105/12* | (2016.01) |
| *F21W 107/30* | (2018.01) |
| *F21W 106/00* | (2018.01) |
| *F21Y 115/10* | (2016.01) |

(52) U.S. Cl.
CPC ............. *B64D 11/00* (2013.01); *F21V 11/08* (2013.01); *B64D 2203/00* (2013.01); *F21W 2106/00* (2018.01); *F21W 2107/30* (2018.01); *F21Y 2105/12* (2016.08); *F21Y 2115/10* (2016.08)

(58) Field of Classification Search
None
See application file for complete search history.

(56) References Cited

U.S. PATENT DOCUMENTS

| | | | |
|---|---|---|---|
| 2002/0149494 A1* | 10/2002 | Martineau | G09F 9/3023 340/815.45 |
| 2014/0374232 A1* | 12/2014 | Hanada | H03K 17/962 200/600 |
| 2018/0215186 A1* | 8/2018 | Hudachek | F21V 3/00 |
| 2018/0367139 A1* | 12/2018 | Pribisic | H03K 17/9622 |

* cited by examiner

*Primary Examiner* — Elmito Breval
(74) *Attorney, Agent, or Firm* — LKGlobal | Lorenz & Kopf, LLP (57) ABSTRACT

Interior panels for interiors of aircraft, aircraft, and methods from making interior panels for interiors of aircraft are provided. In one example, the interior panel includes an outer covering that has a first surface. The first surface is configured to be exposed to the interior of the aircraft. A second surface is disposed opposite the first surface. The second surface has a first pattern formed therein that is hidden from the first surface. A first light source is operative to generate a first light and is disposed adjacent to the second surface generally aligned with the first pattern. When the first light source generates the first light, a first illuminated pattern corresponding to the first pattern formed in the second surface is visible on the first surface.

20 Claims, 5 Drawing Sheets

INTERIOR PANEL FOR AN INTERIOR OF AN AIRCRAFT AND A METHOD FOR MAKING THE SAME

TECHNICAL FIELD

The technical field relates generally to interior panels for an aircraft, and more particularly, relates to interior panels, for example, integrated with hidden illuminable messaging, for an interior of an aircraft, aircraft including such interior panels, and methods for making such interior panels.

BACKGROUND

Many aircraft have interiors that include one or more areas such as a cabin area, lavatory area, galley area, and/or the like for passengers and/or other occupants. These interior areas may include and/or be separated by interior panels that may form part of a bulkhead, decorative surface, and/or the like.

While aboard the aircraft and especially during taxi, take-off, flight, and landing, it is often desirable to communicate information to the passengers and/or other occupants of the aircraft. For example, information regarding a no smoking policy, fastening of seatbelts and/or optional unfastening of seatbelts, notification to be seated and/or remain seated, and/or the like may be desirable information to communicate to the passengers and/or the other occupants.

Many aircraft have various placards and/or signs that are positioned on interior panels in the interior area(s) (e.g., cabin area or the like) of the aircraft. These placards and/or signs include symbols, words, and/or lettering that can be illuminated for communicating information. However, whether the placards and/or signs are illuminated or not, they are visible to the passengers and/or other occupants and can be unsightly and visually disruptive of an otherwise aesthetically pleasing surface. For example, a bulkhead finished with an interior panel that includes an aesthetically pleasing wood-grain surface to which an illuminable fasten-seatbelt sign is mounted will constantly display that sign, even when the sign is not illuminated. As such, the sign will disrupt an otherwise continuous woodgrain appearance of the bulkhead's surface and be unsightly.

Accordingly, it is desirable to provide an interior panel for an interior of an aircraft that addresses one or more of the foregoing issues, aircraft including such interior panels, and methods for making such interior panels. Furthermore, other desirable features and characteristics of the various embodiments described herein will become apparent from the subsequent detailed description and the appended claims, taken in conjunction with the accompanying drawings and this background.

SUMMARY

Various non-limiting embodiments of an interior panel for an interior of an aircraft, an aircraft, and a method for making an interior panel for an interior of an aircraft are provided herein.

In a first non-limiting embodiment, the interior panel includes, but is not limited to, an outer covering that has a first surface. The first surface is configured to be exposed to the interior of the aircraft. A second surface is disposed opposite the first surface. The second surface has a first pattern formed therein that is hidden from the first surface. The interior panel further includes, but is not limited to, a first light source that is operative to generate a first light. The first light source is disposed adjacent to the second surface generally aligned with the first pattern. When the first light source generates the first light, a first illuminated pattern corresponding to the first pattern formed in the second surface is visible on the first surface.

In another non-limiting embodiment, the aircraft includes, but is not limited to, an aircraft structure that has an interior. The aircraft further includes, but is not limited to, an interior panel that is disposed in the interior of the aircraft structure. The interior panel includes an outer covering that has a first surface that is exposed to the interior of the aircraft structure. A second surface is disposed opposite the first surface. The second surface has a first pattern formed therein that is hidden from the first surface. The interior panel further includes a first light source that is operative to generate a first light. The first light source is disposed adjacent to the second surface generally aligned with the first pattern. When the first light source generates the first light, a first illuminated pattern corresponding to the first pattern formed in the second surface is visible on the first surface.

In another non-limiting embodiment, the method includes, but is not limited to, obtaining an outer covering that has a first surface. The first surface is configured to be exposed to the interior of the aircraft. A second surface is disposed opposite the first surface. The method further includes, but is not limited to, forming a first pattern in the second surface that is hidden from the first surface. The method further includes, but is not limited to, disposing a light source adjacent to the second surface generally aligned with the first pattern. The light source is operative to generate light. When the light source generates light, a first illuminated pattern corresponding to the first pattern formed in the second surface is visible on the first surface.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following Detailed Description is merely exemplary in nature and is not intended to limit the various embodiments or the application and uses thereof. Furthermore, there is no intention to be bound by any theory presented in the preceding background or the following detailed description.

Various embodiments contemplated herein relate to interior panels for interiors of aircraft, aircraft including interior panels, and methods for making interior panels for interiors of aircraft. The exemplary embodiments taught herein provide an aircraft having an aircraft structure. The aircraft structure has an interior with an interior panel disposed therein. The interior panel includes an outer covering having a first surface that is exposed to the interior of the aircraft structure and a second surface that is disposed opposite the first surface.

In an exemplary embodiment, the first surface of the outer covering is a relatively smooth, aesthetically pleasing continuous surface. The second surface has a pattern formed therein that is hidden from the first surface. A light source is operative to selectively generate light and is disposed adjacent to the second surface generally aligned with the pattern. When the light source generates the light, an illuminated pattern corresponding to the pattern formed in the second surface is visibly produced on the first surface. Without being limited by theory, in an exemplary embodiment, the outer covering including the pattern allows a first portion of the light that is substantially aligned with the pattern features formed in the second surface to pass therethrough while substantially obstructing a second portion of the light that would otherwise illuminate outside of the borders of the pattern features to make the pattern features on the second surface visibly read through to the first surface as the illuminated pattern.

In an exemplary embodiment, advantageously forming the pattern (e.g., as a symbol) that is hidden from the first surface in the second surface and generating the light to produce the illuminated pattern (e.g., as an illuminated symbol) that corresponds to the pattern visible on the first surface allows for an aesthetically pleasing interior panel that is not otherwise disrupted with a symbol(s) or sign when the light source is turned off. Rather, a symbol(s) is displayed on the first surface of the interior panel only when the light source is turned on and illuminated for selectively communicating information to the passenger(s) or other aircraft occupant(s).

Figure 1:
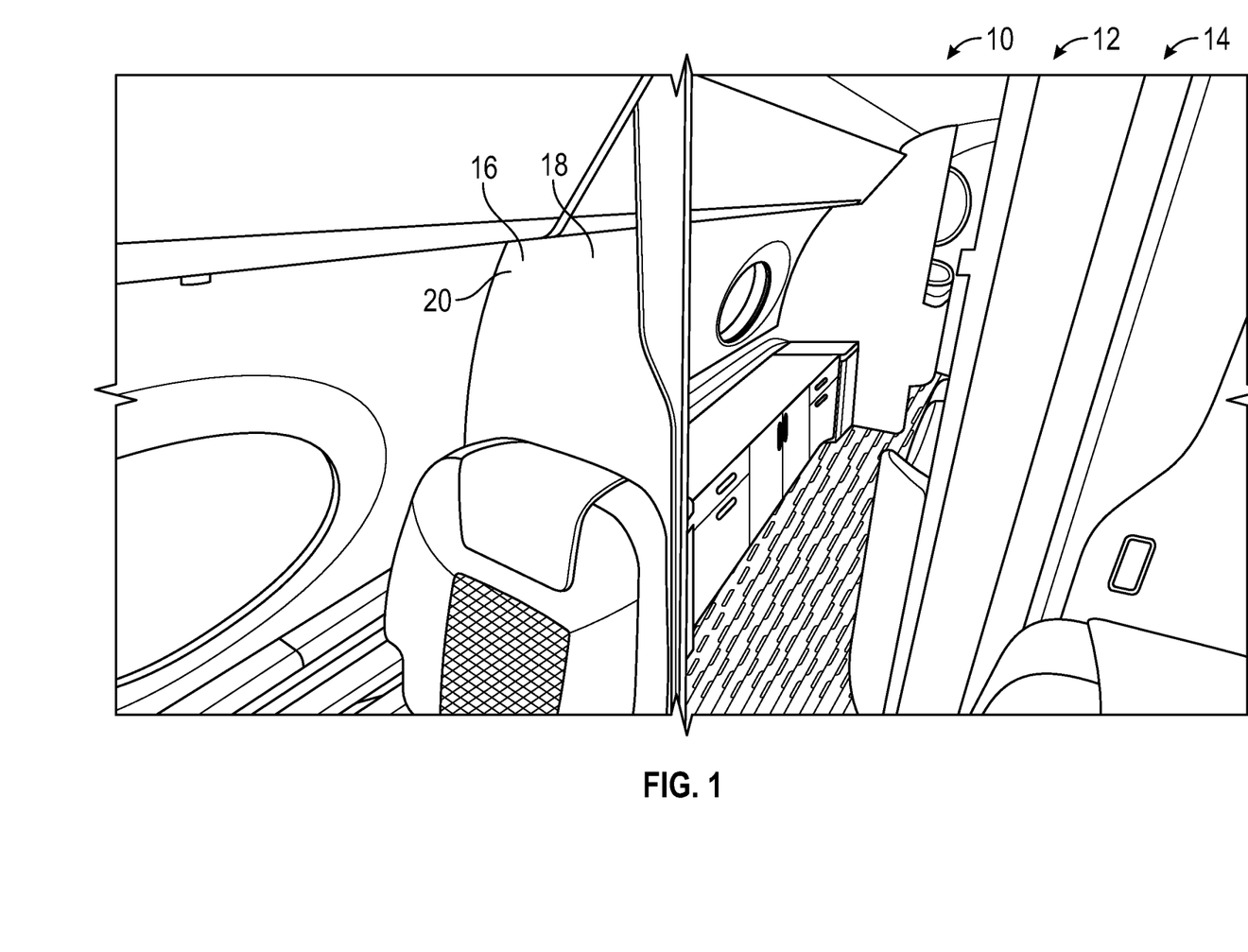
FIG. 1 illustrates a perspective view of a portion of an aircraft interior including an interior panel in accordance with an exemplary embodiment.

Referring to FIG. 1, an aircraft 10 including an aircraft structure 12 in accordance with an exemplary embodiment is provided. The aircraft structure 12 is, for example, a fuselage that surrounds or otherwise has an interior 14 with an interior panel 16 disposed therein. Although the interior 14 of the aircraft 10 is illustrated as having the interior panel 16, it is understood that the interior 14 of the aircraft 10 may include any number of interior panels in addition to the interior panel 16.

The interior panel 16 includes an outer covering 18 that has an outer surface 20 that is exposed to the interior 14 of the aircraft 10. In an exemplary embodiment, the outer covering 18 includes or is made of wood and/or wood veneer, a plastic or polymeric material, a composite or laminated material, for example a wood-plastic composite or wood-plastic laminated construction, a stone veneer, a mirror, a fabric covered panel, a painted panel, a decorated or aesthetically pleasing construction, and/or the like. In an exemplary embodiment, the outer covering 18 includes a veneer that includes the outer surface 20 and that is laminated to or otherwise overlaid on a backing material or substrate.

Figure 2:
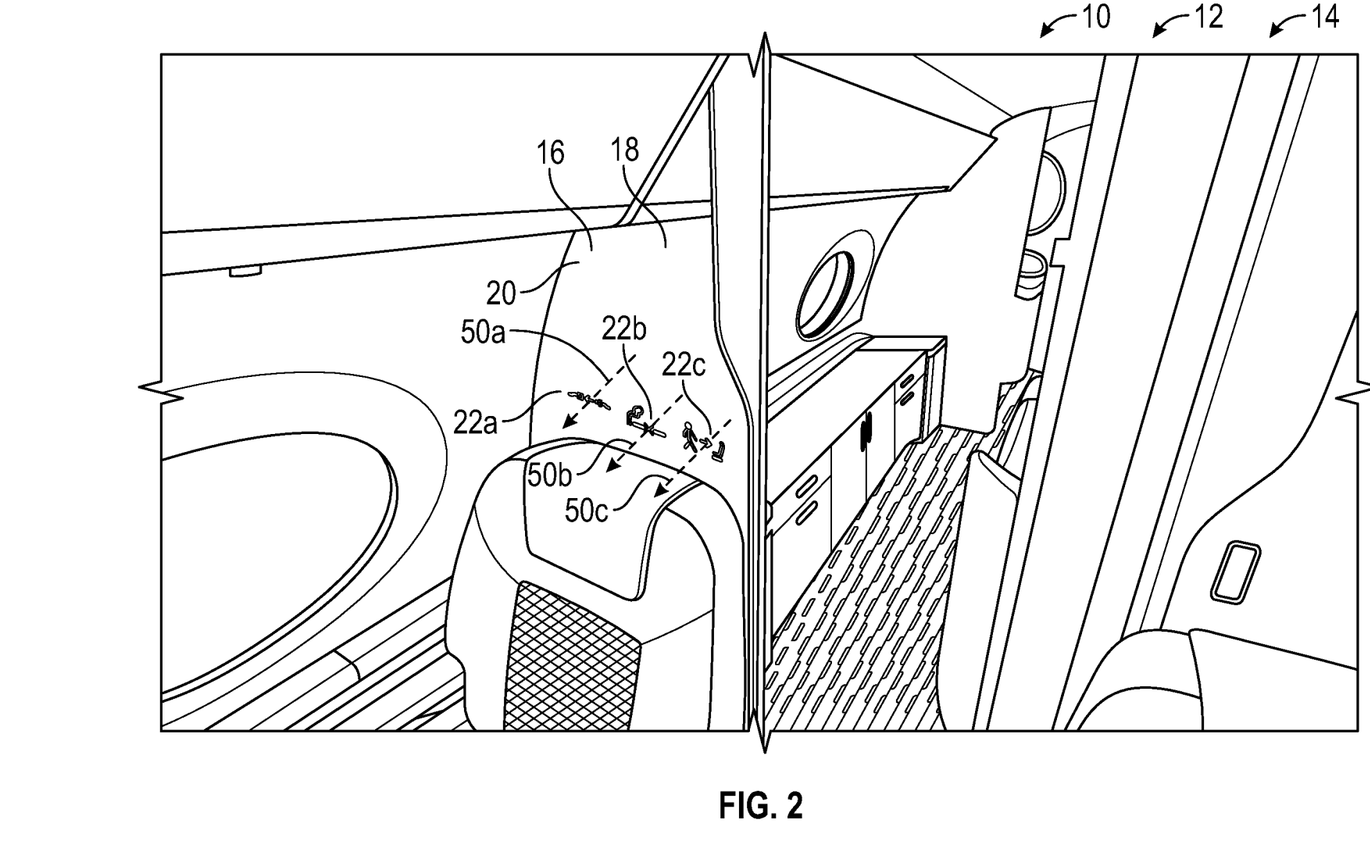
FIG. 2 illustrates a perspective view of a portion of an aircraft interior including an interior panel with illuminated patterns in accordance with an exemplary embodiment.

Referring also to FIG. 2, the interior panel 16 is operative to selectively and independently display illuminated patterns 22*a-c*. Although the interior panel 16 is illustrated as being operative to selectively and independently display three illuminated patterns, various alternate embodiments of the interior panel 16 may include the interior panel 16 being operative to selectively and independently display less than three illuminated patterns but at least one illuminated pattern or to selectively and independently display more than three illuminated patterns. When displayed, the illuminated patterns 22*a-c* are independently visible on the outer surface 20 of the outer covering 18 due to light rays 50*a-c* as will be discussed in further detail below.

Figure 3:
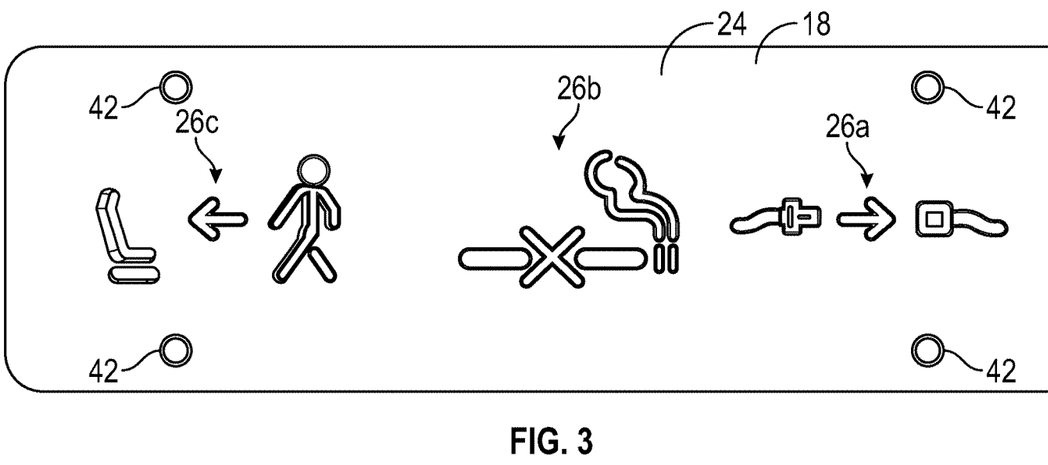
FIG. 3 illustrates a back view of an outer covering of an interior panel that includes patterns in accordance with an exemplary embodiment.

Referring also to FIG. 3, the outer covering 18 has a back surface 24 that is disposed opposite the outer surface 20 facing, for example into an interior or inside of the interior panel 18. As such, the back surface 24 of the outer covering 18 is not exposed to the interior 14 of the aircraft 10. The back surface 24 of the outer covering 18 includes patterns 26*a-c* that are formed in the back surface 24 and that correspond to the shapes of the illuminated patterns 22*a-c*, respectively, of the outer surface 20 of the outer covering 18. As used herein, the term "correspond" refers to articles or patterns having similar, substantially matching, or matching shapes, forms, alignment, and/or structures. In an exemplary embodiment, the patterns 26*a-c* are milled, cut, machined, etched, carved, engraved, or otherwise formed into the back surface 24 of the outer covering 18 so as to locally reduce the wall stock in the outer covering 18 without affecting or otherwise removing any material from the outer surface 20. In an exemplary embodiment, the outer covering 18 has a nominal wall stock of from about 1 to about 4 mm, for example about 1.5 mm, and a localized reduced wall stock of from about 0.2 to about 1 mm that defines the patterns 26*a-c*. The patterns 26*a-c* are therefore hidden from or not visible on the outer surface 20 of outer covering 18.

Figure 5:
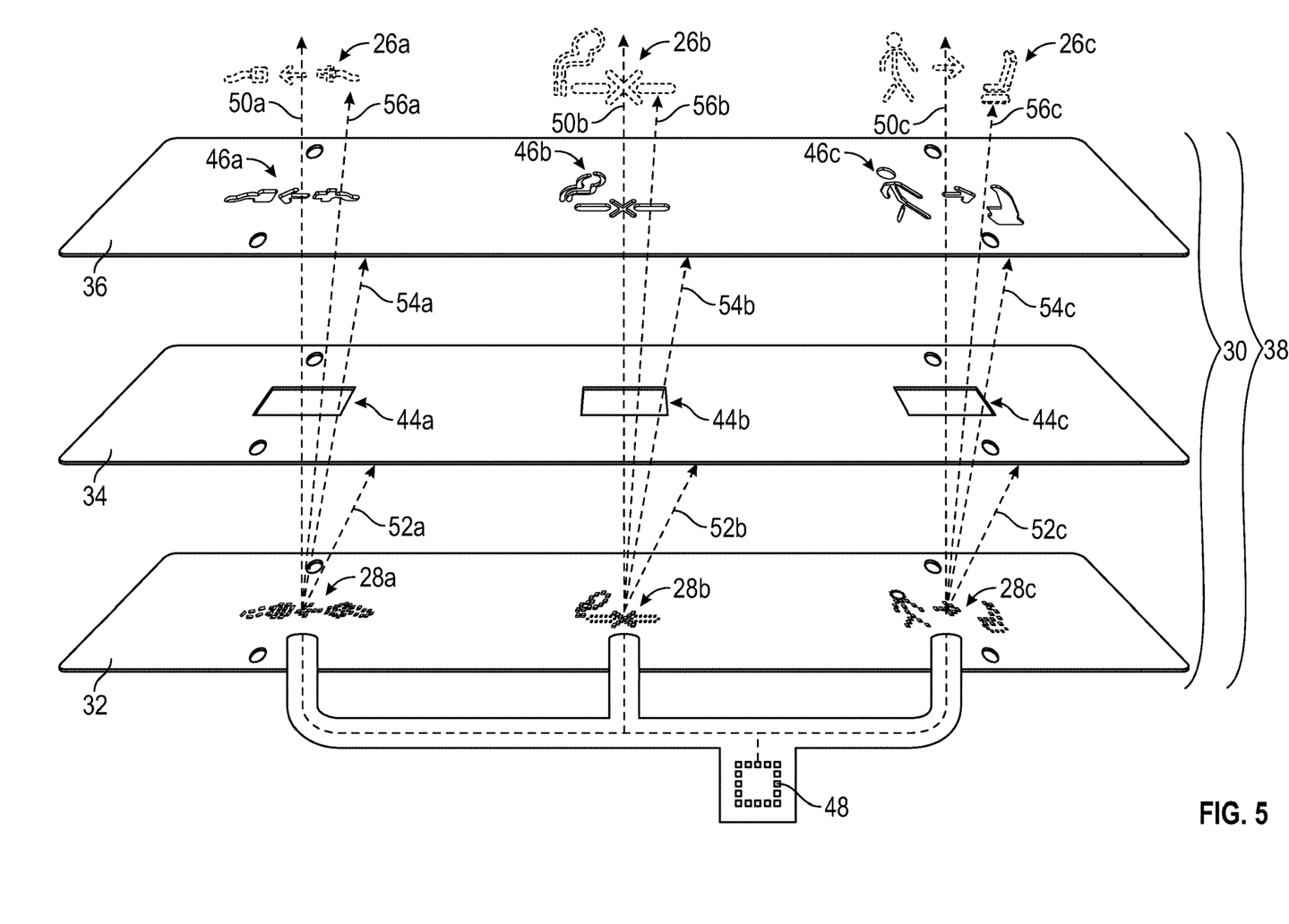
FIG. 5 illustrates an exploded perspective view of a board assembly that includes patterns and light sources that are in communication with a control system in accordance with an exemplary embodiment.

Referring briefly also to FIG. 5 and as will be discussed in further detail below, the interior panel 16 includes light sources 28*a-c* that are disposed in the interior of the interior panel 16 adjacent to the back surface 24 of the outer covering 18 generally aligned with the patterns 26*a-c* (illustrated as dashed line patterns without the outer covering 18 in FIG. 5), respectively. As used herein, the phrase "generally aligned" refers to articles and/or patterns that are arranged, oriented, and/or positioned relative to one another in a linear or substantially linear fashion.

The light sources 28*a-c* are each selectively and independently operative to generate light. For example, each light source 28*a*, 28*b*, and 28*c* can independently be turned on to generate light regardless of whether the other light source(s) 28*a*, 28*b*, and/or 28*c* are turned off or turned on to generate light. When the light source(s) 28*a*, 28*b*, and/or 28*c* generates light, the corresponding pattern(s) 26*a*, 26*b*, and/or 26*c* allows a portion(s) (indicated by light rays 50*a*, 50*b*, and/or 50*c*) of the light to pass through towards the outer surface 20 of the outer covering 18 while substantially obstructing another portion(s) (indicated by light rays 56*a*, 56*b*, and/or 56*c*) of the light generated by the light source(s) 28*a*, 28*b*, and/or 28*c* to make the corresponding illuminated pattern(s) 22*a*, 22*b*, and/or 22*c* visible on the outer surface 20. For example, the portion(s) 56*a*, 56*b*, and/or 56*c* of the light do not pass through the pattern(s) 26*a*, 26*b*, and/or 26*c* while the portion(s) 50*a*, 50*b*, and/or 50*c* of the light do pass through the pattern(s) 26*a*, 26*b*, and/or 26*c* so as to define the shape of the illuminated pattern(s) 22*a*, 22*b*, and/or 22*c*. As used herein, the phrase "substantially obstructing a portion of light" refers to blocking, preventing, and/or hindering the portion of light so that the portion of light is not noticeably visible and/or perceivable. In an exemplary embodiment, the locally reduce wall stock of the outer covering 18 that defines the pattern(s) 26*a*, 26, and/or 26*c* allows the portion(s) 50*a*, 50*b*, and/or 50*c* of the light that is substantially aligned with the pattern(s) 26a, 26, and/or 26c to pass through the locally reduce wall stock while the thicker or nominal wall stock of the outer covering 18 surrounding the borders of the pattern(s) 26a, 26b, and/or 26c substantially prevents or blocks the portion(s) 56a, 56b, and/or 56c of the light that illuminates outside of the borders of the pattern(s) 26a, 26, and/or 26c from passing through the outer covering 18 to make the pattern(s) 26a, 26, and/or 26c on the back surface 24 visibly read through to the outer surface 20 as the illuminated patterns 22a, 22b, and/or 22c, respectively.

Referring to FIGS. 1-5, in an exemplary embodiment, the interior panel 16 includes a board assembly 30. The board assembly 30 is disposed in the interior of the interior panel 16 adjacent to the back surface 24 of the outer covering 18. The board assembly 30 includes a lighting board 32, a masking board 34, and a pattern-refining board 36. In an exemplary embodiment, the lighting board 32, the masking board 34, and the pattern-refining board 36 are stacked on top of each other to form a stacked board assembly 38. As illustrated, the stacked board assembly 38 is held together by a fastener(s) 40 or the like, and the back surface 24 of the outer covering 18 includes corresponding relief holes 42 for the fastener(s) 40.

Figure 4:
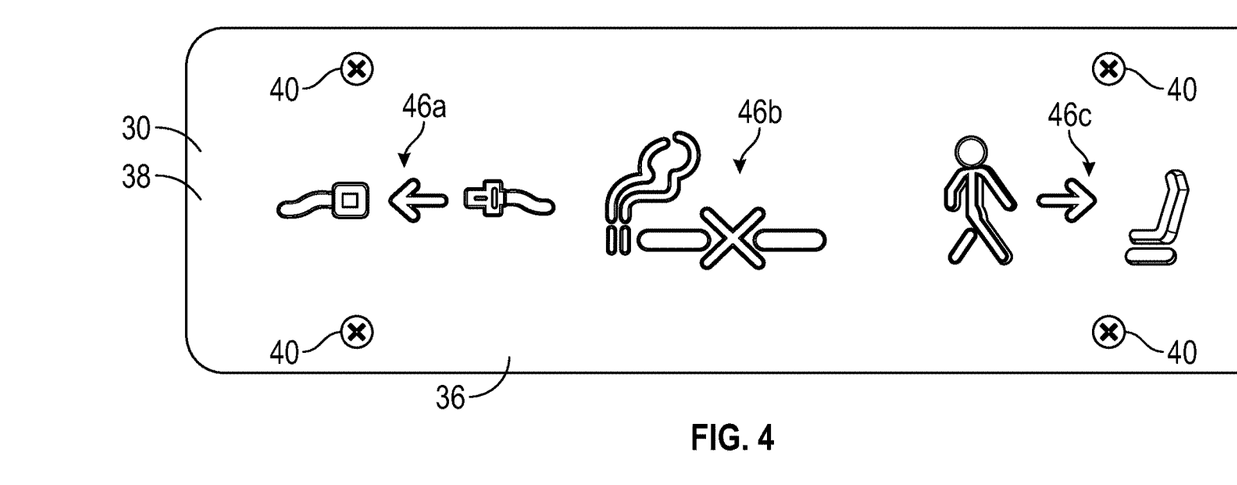
FIG. 4 illustrates a top view of a board assembly that includes patterns in accordance with an exemplary embodiment.

In an exemplary embodiment, the light sources 28a-c as discussed above are mounted on the lighting board 32 and are generally aligned with the corresponding patterns 26a-c. In an exemplary embodiment, the light sources 28a, 28b, and 28c each include a plurality of light-emitting diodes (LEDs) that are mounted on the lighting board 32 and are arranged in light-emitting patterns 44a, 44b, and 44c that substantially correspond to the patterns 26a, 26b, and 26c of the back surface 24 of the outer covering 18. In an exemplary embodiment, the lighting board 32 is a printed circuit board (PCB).

As illustrated, the board assembly 30 includes the masking board 34 that is disposed between the lighting board 32 and the back surface 24 of the outer covering 18. The masking board 34 includes masking patterns 44a-c that are formed through the masking board 34 and that generally align with the light sources 28a-c and the corresponding patterns 26a-c, respectively. When the light source(s) 28a, 28b, and/or 28c is turned on and generates light, the masking pattern(s) 44a, 44b, and/or 44c allows the portion(s) 50a, 50b, and/or 50c of the light to pass through towards the corresponding pattern(s) 26a, 26b, and/or 26c while substantially obstructing another portion(s) (indicated by rays 52a, 52b, and/or 52c) of the light generated by the light source(s) 28a, 28b, and/or 28c to enhance visibility and/or clarity of the corresponding illuminated pattern(s) 22a, 22b, and/or 22c on the outer surface 20. For example, the portion(s) 52a, 52b, and/or 52c of the light do not pass through the masking pattern(s) 44a, 44b, and/or 44c while the portion(s) 50a, 50b, and/or 50c of the light do pass through the masking pattern(s) 44a, 44b, and/or 44c to refine or otherwise reduce scatter of the light that encounters the pattern(s) 26a, 26b, and/or 26c to define the shape of the illuminated pattern(s) 22a, 22b, and/or 22c. In an exemplary embodiment, the masking board 34 is a PCB.

As illustrated, the board assembly 30 includes the pattern-refining board 36 that is disposed between the masking board 34 and the back surface 24 of the outer covering 18. The pattern-refining board 30 includes refining patterns 46a-c that are formed through the pattern-refining board 36 and that generally align with the masking patterns 44a-c and the corresponding patterns 26a-c. When the light source(s) 28a, 28b, and/or 28c generates light, the refining pattern(s) 46a, 46b, and/or 46c allows the portion(s) 50a, 50b, and/or 50c of the light to pass through towards the corresponding pattern(s) 26a, 26b, and/or 26c while substantially obstructing another portion(s) (indicated by rays 54a, 54b, and/or 54c) of the light generated by the light source(s) 28a, 28b, and/or 28c to further enhance visibility and/or clarity of the corresponding illuminated pattern(s) 22a, 22b, and/or 22c on the outer surface 20. For example, the portion(s) 54a, 54b, and/or 54c of the light do not pass through the refining pattern(s) 46a, 46b, and/or 46c while the portion(s) 50a, 50b, and/or 50c of the light do pass through the masking pattern(s) 44a, 44b, and/or 44c to refine the light that encounters the pattern(s) 26a, 26b, and/or 26c to define the shape of the illuminated pattern(s) 22a, 22b, and/or 22c. In an exemplary embodiment, the pattern-refining board 36 is a PCB.

In an exemplary embodiment, the interior panel 16 further includes a control system 48. The control system 48 is in communication with the light sources 28a-c and is operative to direct the light sources 28a-c to generate light. The control system 48 is operative to independently turn on and direct each light source 28a, 28b, and 28c to generate light and to independently direct each light source 28a, 28b, and 28c to turn off and discontinue generating light. For example and as illustrated, each light source 28a, 28b, or 28c is configured as having a pattern that corresponds to the patterns 26a, 26b, or 26c, and is independently directed by the control system 48 to generate or not generate light (e.g., turn on or off). In this way, the presence or visibility of each illuminated pattern 22a, 22b, or 22c is independently controlled by the control system 48 so that the only illuminated pattern(s) 22a, 22b, and/or 22c that are visible on the outer surface 20 are those that correspond to the light source(s) 28a, 28b, and/or 28c that the control system 48 directs to generate light.

Figure 6:
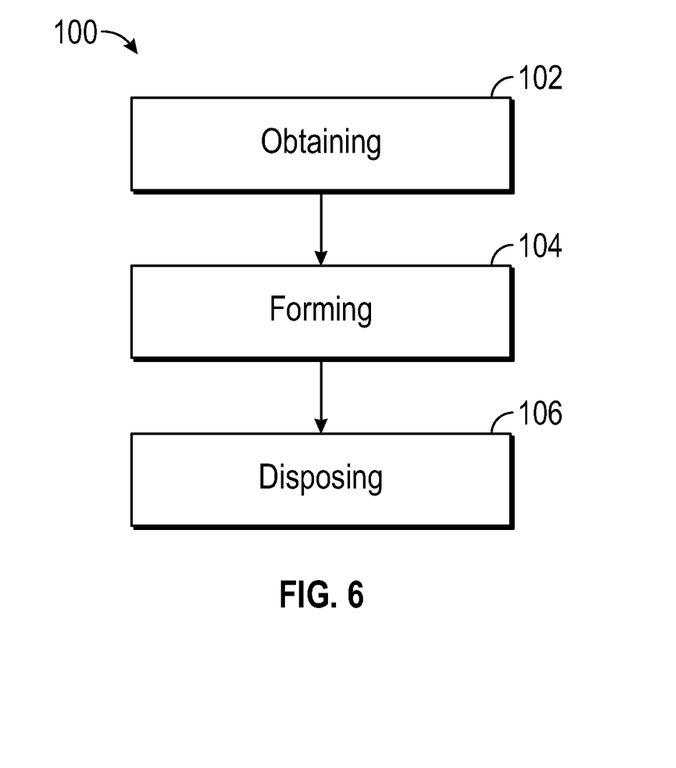
FIG. 6 illustrates a flow diagram for a method for making an interior panel for an interior of an aircraft in accordance with an exemplary embodiment.

Referring to FIG. 6, a method 100 for making an interior panel for an interior of an aircraft in accordance with an exemplary embodiment is provided. The method 100 includes obtaining (STEP 102) an outer covering. For example, the outer covering may be obtained by forming the outer covering, procuring the outer covering, and/or locating the outer covering. The outer covering has a first surface that is configured to be exposed to the interior of the aircraft and a second surface that is disposed opposite the first surface.

A first pattern is formed (STEP 104) in the second surface and is hidden from the first surface. A light source is disposed (STEP 106) adjacent to the second surface and is generally aligned with the first pattern. The light source is operative to generate light. When the light source generates light, an illuminated pattern corresponding to the first pattern formed in the second surface is visible on the first surface.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing an exemplary embodiment of the disclosure. It being understood that various changes may be made in the function and arrangement of elements described in an exemplary embodiment without departing from the scope of the disclosure as set forth in the appended claims.

What is claimed is:

1. An interior panel for a structure having an interior of an aircraft, the interior panel comprising:
   an outer covering having a first surface that is configured to be exposed to the interior of the aircraft and a second surface that is disposed opposite the first surface, wherein the second surface has a first pattern formed therein that is hidden from the first surface; and
   a first light source operative to generate a first light and disposed adjacent to the second surface generally aligned with the first pattern, wherein when the first light source generates the first light, a first illuminated pattern corresponding to the first pattern formed in the second surface is visible on the first surface.

2. The interior panel of claim 1, wherein the interior panel includes a board assembly that is disposed adjacent to the second surface and that includes a first board, and wherein the first light source is mounted on the first board generally aligned with the first pattern.

3. The interior panel of claim 2, wherein the board assembly includes a masking board that is disposed between the first board and the second surface, wherein the masking board has a first masking pattern formed therethrough generally aligned with the first light source and the first pattern, and wherein when the first light source generates the first light, the first masking pattern allows a first portion of the first light to pass therethrough towards the first pattern while substantially obstructing a second portion of the first light to enhance visibility of the first illuminated pattern on the first surface.

4. The interior panel of claim 3, wherein the board assembly includes a pattern board that is disposed between the masking board and the second surface, wherein the pattern board has a first preliminary pattern formed therethrough that substantially corresponds to the first pattern and that is generally aligned with the first masking pattern and the first pattern, and wherein when the first light source generates the first light, the first preliminary pattern allows a first part of the first portion of the first light to pass therethrough towards the first pattern while substantially obstructing a second part of the first portion of the first light to enhance visibility of the first illuminated pattern on the first surface.

5. The interior panel of claim 4, wherein the first board, the masking board, and the pattern board are stacked on top of each other to form a stacked board assembly.

6. The interior panel of claim 2, wherein the first light source includes a plurality of light-emitting diodes (LEDs) that are mounted on the first board and that are arranged in a first light-emitting pattern that substantially corresponds to the first pattern.

7. The interior panel of claim 6, wherein the first board is a printed circuit board (PCB).

8. The interior panel of claim 2, wherein the second surface has a second pattern formed therein that is disposed adjacent to the first pattern and that is hidden from the first surface, wherein the interior panel further includes a second light source that is operative to generate a second light and that is mounted on the first panel adjacent to the first light source and generally aligned with the second pattern, and wherein when the second light source generates the second light, a second illuminated pattern corresponding to the second pattern formed in the second surface is visible on the first surface.

9. The interior panel of claim 8, wherein the board assembly includes a masking board that is disposed between the first board and the second surface, wherein the masking board has a first masking pattern formed therethrough that is generally aligned with the first light source and the first pattern and a second masking pattern formed therethrough that is generally aligned with the second light source and the second pattern, wherein when the first light source generates the first light, the first masking pattern allows a first portion of the first light to pass therethrough towards the first pattern while substantially obstructing a second portion of the first light from the second pattern, and wherein when the second light source generates the second light, the second masking pattern allows a third portion of the second light to pass therethrough towards the second pattern while substantially obstructing a fourth portion of the second light from the first pattern.

10. The interior panel of claim 9, wherein the board assembly includes a pattern board that is disposed between the masking board and the second surface, wherein the pattern board has a first preliminary pattern formed therethrough that substantially corresponds to the first pattern and that is generally aligned with the first masking pattern and the first pattern, wherein the pattern board has a second preliminary pattern formed therethrough that substantially corresponds to the second pattern and that is generally aligned with the second masking pattern and the second pattern, wherein when the first light source generates the first light, the first masking pattern allows the first portion of the first light to pass through to the first preliminary pattern that allows a first part of the first portion of the first light to pass therethrough towards the first pattern while substantially obstructing a second part of the first portion of the first light to enhance visibility of the first illuminated pattern visible on the first surface, and wherein when the second light source generates the second light, the second masking pattern allows the third portion of the second light to pass through to the second preliminary pattern that allows a third part of the third portion of the second light to pass therethrough towards the second pattern while substantially obstructing a fourth part of the third portion of the second light to enhance visibility of the second illuminated pattern visible on the first surface.

11. An aircraft comprising:
    an aircraft structure having an interior; and
    an interior panel disposed in the interior of the aircraft structure, the interior panel comprising:
       an outer covering having a first surface that is exposed to the interior of the aircraft structure and a second surface that is disposed opposite the first surface, wherein the second surface has a first pattern formed therein that is hidden from the first surface; and
       a first light source operative to generate a first light and disposed adjacent to the second surface generally aligned with the first pattern, wherein when the first light source generates the first light, a first illuminated pattern corresponding to the first pattern formed in the second surface is visible on the first surface.

12. The aircraft of claim 11, wherein the aircraft further includes a control system that is in communication with the first light source and that is operative to direct the first light source to generate the first light.

13. The aircraft of claim 12, wherein the second surface of the interior panel has a second pattern formed therein that is hidden from the first surface, wherein the interior panel further includes a second light source that is operative to generate a second light and that is disposed adjacent to the second surface generally aligned with the second pattern, and wherein when the second light source generates the second light, a second illuminated pattern corresponding to the second pattern formed in the second surface is visible on the first surface.

14. The aircraft of claim 13, wherein the control system is in communication with the second light source and is operative to independently direct the first light source to generate the first light and the second light source to generate the second light.

15. The aircraft of claim 14, wherein the interior panel includes a board assembly that is disposed adjacent to the second surface and that includes a first board, wherein the first light source is mounted on the first board generally aligned with the first pattern, and wherein the second light source is mounted on the first board generally aligned with the second pattern.

16. The aircraft of claim 15, wherein the board assembly includes a masking board that is disposed between the first board and the second surface, wherein the masking board has a first masking pattern formed therethrough that is generally aligned with the first light source and the first pattern and a second masking pattern formed therethrough that is generally aligned with the second light source and the second pattern, wherein when the control system directs the first light source to generate the first light, the first masking pattern allows a first portion of the first light to pass therethrough towards the first pattern while substantially obstructing a second portion of the first light, and wherein when the control system directs the second light source to generate the second light, the second masking pattern allows a third portion of the second light to pass therethrough towards the second pattern while substantially obstructing a fourth portion of the second light.

17. The aircraft of claim 16, wherein the board assembly includes a pattern board that is disposed between the masking board and the second surface, wherein the pattern board has a first preliminary pattern formed therethrough that substantially corresponds to the first pattern and that is generally aligned with the first masking pattern and the first pattern, wherein the pattern board has a second preliminary pattern formed therethrough that substantially corresponds to the second pattern and that is generally aligned with the second masking pattern and the second pattern, wherein when the control system directs the first light source to generate the first light, the first masking pattern allows the first portion of the first light to pass through to the first preliminary pattern that allows a first part of the first portion of the first light to pass therethrough towards the first pattern while substantially obstructing a second part of the first portion of the first light to enhance visibility of the first illuminated pattern visible on the first surface, and wherein when the control system directs the second light source to generate the second light, the second masking pattern allows the third portion of the second light to pass through to the second preliminary pattern that allows a third part of the third portion of the second light to pass therethrough towards the second pattern while substantially obstructing a fourth part of the third portion of the second light to enhance visibility of the second illuminated pattern visible on the first surface.

18. The aircraft of claim 17, wherein the first light source includes a first plurality of light-emitting diodes (LEDs) that are mounted on the first board and that are arranged in a first light-emitting pattern that substantially corresponds to the first pattern, and wherein the second light source includes a second plurality of LEDs that are mounted on the first board and that are arranged in a second light-emitting pattern that substantially corresponds to the second pattern.

19. The aircraft of claim 18, wherein the first board is a printed circuit board (PCB).

20. A method for making an interior panel for a structure having an interior of an aircraft, the method comprising the steps of:
obtaining an outer covering that has a first surface that is configured to be exposed to the interior of the aircraft and a second surface that is disposed opposite the first surface;
forming a first pattern in the second surface that is hidden from the first surface; and
disposing a light source adjacent to the second surface generally aligned with the first pattern, wherein the light source is operative to generate light, and wherein when the light source generates light, an illuminated pattern corresponding to the first pattern formed in the second surface is visible on the first surface.

* * * * *